US008480929B2

(12) United States Patent
Hihara et al.

(10) Patent No.: US 8,480,929 B2
(45) Date of Patent: *Jul. 9, 2013

(54) CORROSION PROTECTION COATINGS AND METHODS OF MAKING THE SAME

(76) Inventors: Lloyd H. Hihara, Mililani, HI (US); Atul Tiwari, Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,341

(22) Filed: Jul. 5, 2012

(65) Prior Publication Data

US 2012/0288723 A1 Nov. 15, 2012

Related U.S. Application Data (63) Continuation of application No. 12/683,940, filed on Jan. 7, 2010, now Pat. No. 8,236,203.

(60) Provisional application No. 61/212,969, filed on Apr. 15, 2009.

(51) Int. Cl.
*C09K 15/32* (2006.01)
*C23F 11/12* (2006.01)

(52) U.S. Cl.
USPC .............. 252/389.31; 252/400.31; 528/10; 528/12; 528/14

(58) Field of Classification Search
None
See application file for complete search history.

(56) References Cited

U.S. PATENT DOCUMENTS

| | | | | |
|---|---|---|---|---|
| 3,907,848 A * | 9/1975 | Ferguson | | 556/9 |
| 4,368,313 A * | 1/1983 | Hayes | | 528/14 |
| 5,508,062 A | 4/1996 | Haluska et al. | | |
| 5,728,770 A * | 3/1998 | Yamamoto et al. | | 524/755 |
| 6,010,757 A * | 1/2000 | Yamamoto et al. | | 428/1.25 |
| 6,159,546 A * | 12/2000 | Yamamoto et al. | | 427/358 |
| 6,166,163 A | 12/2000 | Kudo et al. | | |
| 6,306,998 B1 * | 10/2001 | Kimura et al. | | 528/12 |
| 6,593,413 B2 * | 7/2003 | Muramatsu et al. | | 524/493 |
| 2001/0049427 A1 * | 12/2001 | Atwood et al. | | 528/10 |
| 2004/0229040 A1 | 11/2004 | Kudo et al. | | |
| 2004/0260048 A1 * | 12/2004 | Itagaki et al. | | 528/34 |
| 2005/0118218 A1 | 6/2005 | Cassin | | |
| 2006/0135709 A1 * | 6/2006 | Hasegawa et al. | | 525/474 |
| 2007/0048540 A1 * | 3/2007 | Ragunathan et al. | | 428/500 |
| 2008/0090069 A1 * | 4/2008 | Walters et al. | | 428/330 |
| 2011/0028646 A1 * | 2/2011 | Sixt et al. | | 524/858 |

OTHER PUBLICATIONS

International Search Report and Written Opinion dated Aug. 25, 2011 for application No. PCT/US2010/059730, 12 pp.

* cited by examiner

*Primary Examiner* — Joseph D Anthony
(74) *Attorney, Agent, or Firm* — Holland & Hart LLP; Bryan G. Pratt

(57) ABSTRACT

A corrosion protection composition includes a mixture of three different silanes selected to interact and form a coating on metal substrates that has improved adhesion and durability as well as UV protection properties. Methods of manufacturing the corrosion protection composition include mixing the silanes together and further combining the silane mixture with other mixtures to arrive at the corrosion protection composition. Sonication may be a preferred manner of mixing together the various components of the mixtures.

16 Claims, 5 Drawing Sheets

CORROSION PROTECTION COATINGS AND METHODS OF MAKING THE SAME

CROSS REFERENCE TO RELATED PATENT APPLICATIONS

This application is a continuation of U.S. patent application Ser. No. 12/683,940, filed Jan. 7, 2010, which claims priority to U.S. Provisional Patent Application No. 61/212,969, filed Apr. 15, 2009, the entirety of which is hereby incorporated by reference.

This invention was made with Government support under grant/project number DAAE30-03-C-1071 awarded by the U.S. Army, TACOM/ARDEC. The Government has certain rights in this invention.

BACKGROUND

Deterioration of material from corrosion remains a challenging problem across many industries. It is expected that the annual losses due to corrosion of materials in the United States alone is about US$350 billion, or 3-4% of the gross domestic product. Accordingly, a vast industry has emerged around the development of corrosion protection coatings and the like.

However, developing successful coatings that provide corrosion protection of metals and alloys is a challenging task, partly due to restrictions imposed by the Environmental Protection Agency (EPA) on the use of environmentally hostile chemicals. For example, aluminum and its alloys have historically been protected by thin chromate conversion coatings or chromated primers, but the EPA has placed restrictions on the use of these coatings and primers due to the health risks associated therewith.

Unfortunately, alternatives to chromate conversion coatings also face their own set of problems. Organic-inorganic, ceramic-polymer hybrid (i.e., ceramer) materials possess excellent environmental stability, but their long-term use in aggressive climates remains questionable. Free volume associated with these hybrid coatings often provides percolation pathways for ions and electrolytes to reach the substrate material and initiate corrosion. Many organic coatings are susceptible to in-diffusion of moisture due to their micro-porous structure, and also tend to degrade in the presence of solar radiation. Inorganic coatings may be relatively impervious and resistant to solar degradation, but tend to be brittle and susceptible to cracking on flexible substrates. Silicone-based coatings can include relatively high hydrocarbon content to ensure good adhesion to the substrate, but tend to fail due to moisture-induced delamination. Even the material on which a corrosion protection coating is to be used can lead poor performance. For example, the adherence of corrosion protections coatings to aluminum materials can be hindered by the rapid formation of an inert oxide layer on the top of bare aluminum surfaces.

SUMMARY

Disclosed are embodiments of a corrosion protection composition and methods of making the same utilizing a mixture of silanes. The corrosion protection composition can be used to coat various types of metals and protect against corrosion.

In some embodiments, a corrosion protection composition includes a first mixture of three silanes. The first silane may be methyltriacetoxysilane, dimethyldiacetoxysilane, or trimethylacetoxysilane. The second silane can be methyltrimethoxysilane. The third silane can be tetramethoxysilane or tetraethoxysilane.

In some embodiments, a method for manufacturing a corrosion protection composition includes the preparation and combination of various mixtures to produce the corrosion protection composition. The method can include a step of preparing a preliminary mixture that includes three Mimes. The first silane may be methyltriacetoxysilane, dimethyldiacetoxysilane, or trimethylacetoxysi lane. The second silane can be methyltrimethoxysilane. The third silane can be tetramethoxysilane or tetraethoxysilane. The method may also include a step of preparing an intermediate mixture. The intermediate mixture may include the preliminary mixture and a first supplemental mixture. The first supplemental mixture can include an alkali metal salt. The method may include a further step of preparing a colloidal suspension. The colloidal suspension can include the intermediate mixture and a second supplemental mixture. The second supplemental mixture can include a titaniumalkoxide. The method may also include a step of preparing a corrosion protection composition. The corrosion protection composition can include the colloidal suspension and a third supplemental mixture. The third supplemental mixture can include a tin catalyst or a titanium catalyst.

It is to be understood that the foregoing is a brief summary of various aspects of some disclosed embodiments. The scope of the disclosure need not therefore include all such aspects or address or solve all issues noted in the background above. In addition, there are other aspects of the disclosed embodiments that will become apparent as the specification proceeds.

The foregoing and other features, utilities, and advantages of the subject matter described herein will be apparent from the following more particular description of certain embodiments as illustrated in the accompanying drawings. In this regard, it is to be understood that the scope of the invention is to be determined by the claims as issued and not by whether given subject includes any or all features or aspects noted in this Summary or addresses any issues noted in the Background.

BRIEF DESCRIPTION OF THE DRAWINGS

The preferred and other embodiments are disclosed in association with the accompanying drawings in which.

DETAILED DESCRIPTION

The corrosion protection composition described herein generally includes a first mixture of three different silanes. The three silanes may interact to ultimately form a network that is the foundation of the corrosion protection composition. In order to create the desired network, specific silanes may be selected for the first mixture.

The first silane included in the first mixture may be methyltriacetoxysilane, dimethyldiacetoxysilane, or trimethylacetoxysilane. The first silane may be selected from this group due to the presence of methyl groups and acetate groups in the compounds. As part of the synthesis of the network of the corrosion protection composition, the methyl groups may induce facile hydrolysis of the acetate groups containing silane.

The second silane included in the first mixture may be methyltrimethoxysilane. Similar to the first silane, methyltrimethoxysilane may be selected as the second silane due to the presence of the methyl groups and the ability of the methyl groups to promote the hydrolysis of the methoxy linkages in the second silane.

The third silane included in the first mixture may be either tetramethoxysilane or tetraethoxysilane. The third silane may be selected as a silane capable of crosslinking the silanols formed after hydrolysis in the first and second silanes and ultimately forming the network of the corrosion protection-composition.

Each of the silanes used in the first mixture may be from about 90% to about 99% pure. The amount of each silane in the first mixture may generally be any amount which results in the formation of the network described above. In some embodiments, from about 3.0% to about 10.0% of the first mixture may be the first silane, from about 2.0% to about 8.0% of the first mixture may be the second silane, and from about 0.5% to about 3.0% of the first mixture may be the third silane. Deviations from these amounts may result in undesirable characteristics of the corrosion protection composition. For example, excess amounts of the first silane in the corrosion protection composition may result in corrosion of the substrate when coated with the corrosion protection composition. Excess amounts of the second silane may result in a coating having poor barrier properties. Excess amounts of the third silane may result in cracking in the coating formed by the corrosion protection composition.

The first mixture may further include one or more solvents to facilitate the interaction between the three silanes. Any suitable solvent may be used. In some embodiments, the solvent may be isopropanol, methanol, ethanol, butanol, or any combination thereof. The amount of solvent in the first mixture may range from about 79.0% to about 94.5% of the first mixture.

In some embodiments, the corrosion protection composition may include further mixtures. In some embodiments, a second mixture is included with the first mixture as part of the corrosion protection composition. The second mixture may generally include an alkali metal salt. The alkali metal salt may serve as a pH regulator. Any suitable alkali metal salt may be used. In some embodiments, the alkali metal salt may be either sodium bicarbonate or potassium bicarbonate. The second mixture may also include ultra pure water. The alkali metal salt may amount to from about 2:0% to about 15.0% of the second mixture and the ultrapure water may amount to from about 85.0% to about 98.0% of the second mixture.

A third mixture that may also be included as part of the corrosion protection composition may generally include a titaniumalkoxide. The titaniumalkoxide may be included in the composition to impart UV light protection to the composition. The titaniumalkoxide may be incorporated into the network of the composition. Any suitable titaniumalkoxide may be used. In some embodiments, the titaniumalkoxide may be titanium (IV) ethoxide or titanium (IV) methoxide.

The third mixture may also include a solvent. Any suitable solvent may be used. In some embodiments, the solvent may be isopropanol, methanol, ethanol, butanol, or any combination thereof. The titaniumalkoxide may amount to from about 0.1% to about 2.0% of the third mixture and the solvent may amount to from about 98.0% to about 99.9% of the third mixture.

A fourth mixture that may also be included as part of the corrosion protection composition may generally include a tin catalyst or a titanium catalyst. Any suitable tin catalyst or titanium catalyst may be used. In some embodiments, the tin catalyst may be dibutyl tin dilaurate, di-n-butyldiacetoxytin, dibutyltin diisooctylmaleate, di-n-butylbis(2,4-pentanedionate)tin, di-n-butylbutoxychlorotin, dioetyltindilattrate, dimethyltin dineodecanoate, and bis(neodecanoate)tin. In some embodiments, the titanium catalyst may be titanium 2-ethylhexoxide, titanium di-n-butoxide (bis-2,4-pentanedionate), titanium diisopropoxide(bis-2,4-pen-tanedionate), titanium diisopropoxide bis(ethyl-acetoacetate), titanium trimethylsiloxide. The tin or titanium catalyst may be used to increase the hardening process of the corrosion protection composition.

In some embodiments, the fourth mixture may further include a second solvent and a co-solvent. Any suitable solvents may be used in the fourth mixture. In some embodiments, the second solvent may be isopropanol, methanol, ethanol, butanol or any combination thereof, and the co-solvent may be diethylether. The co-solvent may be used in the fourth mixture for its surface cleaning ability. The tin or titanium catalyst may amount to from about 0.05% to about 0.20% of the fourth mixture, the second solvent may amount to from about 30.0% to about 50.0% of the fourth mixture, and the co-solvent may amount to from about 50.0% to about 70.0% of the fourth mixture. In some embodiments, the second solvent may amount to from 40.02% to about 40.03% of the fourth mixture, and co-solvent from about 59.88% to about 59.97% of the fourth mixture.

When all four mixtures are used in the corrosion protection composition, the first mixture may amount to from about 50.0% to about 80.0% of the corrosion protection composition, the second mixture may amount to about 0% to about 10.0% of the corrosion protection composition, the third mixture may amount to from about 5.0% to about 25.0% of the corrosion protection composition, and the fourth mixture may amount to from about 5.0% to about 25.0% of the corrosion protection composition. In some embodiments, the first mixture may amount to from about 63.0% to about 70.0% of the corrosion protection composition, the second mixture may amount to about 3.0% to about 4.0% of the corrosion protection composition, the third mixture may amount to from about 13.0% to about 17.0% of the corrosion protection composition, and the fourth mixture may amount to from about 13.0% to about 17.0% of the corrosion protection composition.

Figure 1:
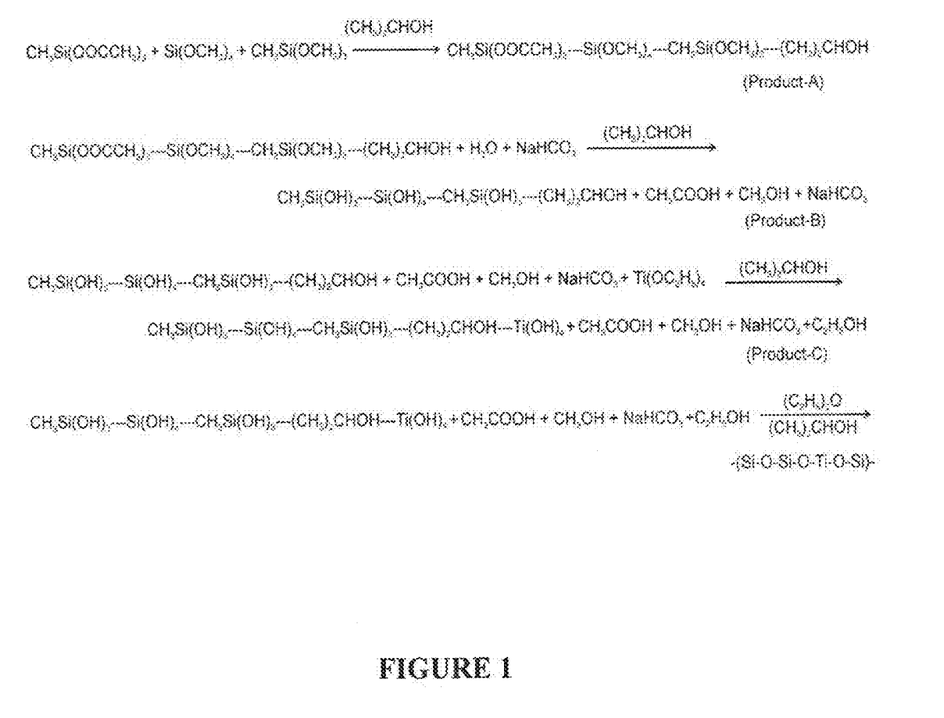
FIG. 1 illustrates, a possible mode of interaction between silanes used in composition and methods described herein.

With reference to FIG. 1, a possible reaction mechanism between the four mixtures is shown.

Figure 2:
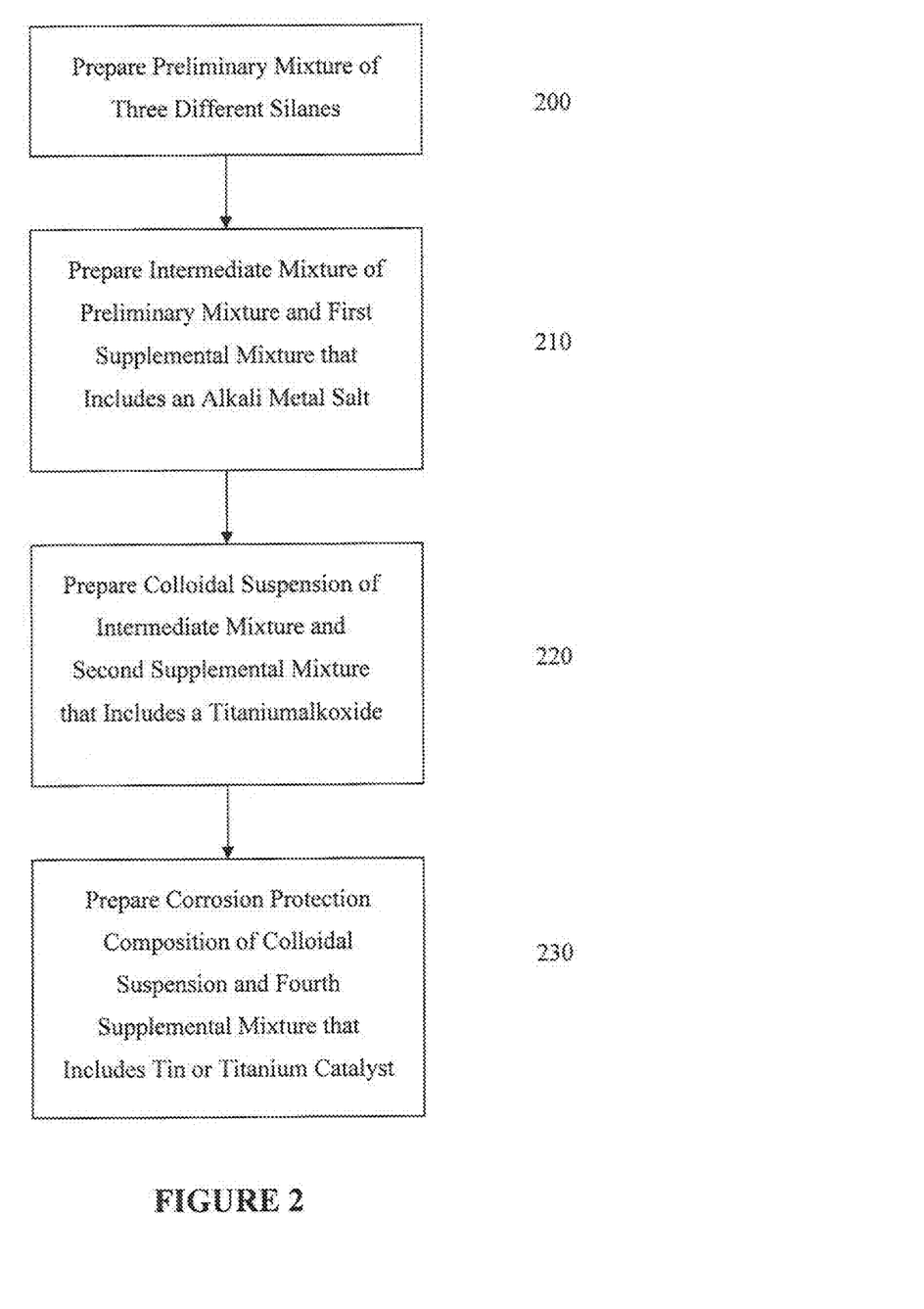
FIG. 2 is a flow chart detailing a method for manufacturing a corrosion protection composition as disclosed herein.

A method for manufacturing the corrosion protection composition described herein may generally include the preparation of various mixtures and the combining of those mixtures to eventually arrive at the corrosion protection composition. With reference to FIG. 2, the method may generally include a step 200 of preparing a preliminary mixture of three different silanes, a step 210 of preparing an intermediate mixture of the preliminary mixture and a first supplemental mixture that includes an alkali metal salt, a step 220 of preparing a colloidal suspension of the intermediate mixture and a second supplemental mixture that includes a titaniumalkoxide, and a step 230 of preparing a corrosion protection composition of the colloidal suspension and a fourth supplemental mixture that includes a tin or titanium catalyst.

Beginning with step 200, the preliminary mixture may be prepared by combining three different silanes together. The preliminary mixture may be similar or identical to the first mixture described in greater detail above. As with the first mixture described in greater detail above, the preliminary mixture may further include a solvent, such isopropanol.

Any manner of preparing the preliminary mixture that includes combining the three silanes together may be used. In some embodiments, the preparation of the preliminary mixture may include combining the three silanes in a vessel and sonicating the materials to promote interaction between the silanes. The sonication can be carried out by any apparatus capable of sonicating mixtures. The sonication may also be carried out for any suitable period of time. In some embodiments, the sonication is carried out from about 2.0 minutes to about 30.0 minutes, and preferably for about 15 minutes.

With respect to step 210, the intermediate mixture may be prepared by combining the preliminary mixture with a first supplemental mixture. The first supplemental mixture may be similar or identical to the second mixture described in greater detail above, including the presence of an alkali metal salt in the mixture. Also as described above with respect to the second mixture, the first supplemental mixture may include ultra pure water. Any manner of preparing the first supplemental mixture that includes combining the alkali metal salt and the ultra pure water may be used. In some embodiments, the preparation of the first supplemental mixture may include combining the alkali metal salt and the ultra pure water in a vessel and sonicating the materials. The sonication can be carried out by any apparatus capable of sonicating mixtures. The sonication may also be carried out for any suitable period of time. In some embodiments, the sonication is carried out for from about 2.0 minutes to about 30.0 minutes, and preferably for about. 15 minutes.

Any mariner of preparing the intermediate mixture that includes combining the preliminary mixture and the first supplemental mixture may be used. In some embodiments, the preparation of the intermediate mixture may include combining the preliminary mixture and the first supplemental mixture in a vessel and sonicating the materials. The sonication can be carried out by any apparatus capable of sonicating mixtures. The sonication may also be carried out for any suitable period of time. In some embodiments, the sonication is carried out for from about 2.0 minutes to about 60.0 minutes, and preferably for about 30 minutes.

With respect to step 220, the colloidal suspension may be prepared by combining the intermediate mixture with a second supplemental mixture. The second supplemental mixture may be similar or identical to the third mixture described in greater detail above, including the presence of a titaniumalkoxide in the mixture. Also as described above with respect to the third mixture, the second supplemental mixture may include solvent. Any manner of preparing the second supplemental mixture that includes combining the titaniumalkoxide and the solvent may be used. In some embodiments, the preparation of the second supplemental mixture may include combining the titanium alkoxide and the solvent in a vessel and sonicating the materials. The sonication can be carried out by any apparatus capable of sonicating mixtures. The sonication may also be carried out for any suitable period of time. In some embodiments, the sonication is carried out for from about 2.0 minutes to about 30.0 minutes, and preferably for about 15 minutes.

Any manner of preparing the colloidal suspension that includes combining the intermediate mixture and the second supplemental mixture may be used. In some embodiments, the preparation of the colloidal suspension may include combining the intermediate mixture and the second supplemental mixture in a vessel and sonicating the materials. The sonication can be carried out by any apparatus capable of sonicating mixtures. The sonication may also be carried out for any suitable period of time. In some embodiments, the sonication is carried out for from about 2.0 minutes to about 60.0 minutes, and preferably for about 30 minutes.

With respect to step 230, the corrosion protection composition may be prepared by combining the colloidal suspension with a third supplemental mixture. The third supplemental mixture may be similar or identical to the fourth mixture described in greater detail above, including the presence of a tin or titanium catalyst in the mixture. Also as described above with respect to the fourth mixture, the third supplemental mixture may include a solvent and a co-solvent. Any manner of preparing the third supplemental mixture that includes combining the tin or titanium catalyst, the solvent, and the co-solvent may be used. In some embodiments, the preparation of the third supplemental mixture may include combining the'tin or titanium catalyst, the solvent, and the co-solvent in, a vessel and sonicating the materials. The sonication can be carried out by any apparatus capable of sonicating.mixtures. The sonication may also be carried out for any suitable period of time. In some embodiments, the sonication is carried out for from about 2.0 minutes to about 30.0 minutes, and preferably for about 15 minutes.

Any manner of preparing the corrosion protection composition that includes combining the colloidal suspension and the third supplemental mixture may be used. In some embodiments, the preparation of the corrosion protection composition may include combining the colloidal suspension and the third supplemental mixture in a vessel and sonicating the materials. The sonication can be carried out by any apparatus capable of sonicating mixtures.

The sonication may also be carried out for any suitable period of time. In some embodiments, the sonication is carried out for from about 2.0 minutes to about 60.0 minutes, and preferably for about 30 minutes.

The corrosion protection composition manufactured by the method described herein may generally be a colorless, transparent liquid. In some embodiments, pigment may be added to the composition to give the composition color. The viscosity of the corrosion protection composition is relatively low, and may generally be similar to the viscosity of water. The low viscosity of the corrosion protection composition may allow the composition to creep into crevices in the substrate to be coated.

Substrates may be coated with the corrosion protection composition described herein by any suitable method. In some embodiments, the composition may be sprayed or brushed onto the substrate, or the substrate may be dip coated with the composition. After the composition has been applied to substrate, the composition may be allowed to harden and form a coating on the substrate. The coating may generally be dry to the touch within 30 minutes of coating and may be handled within 3 hours of coating. Left under ambient conditions, the coating may be almost completely cured within around 12 hours of coating and may be at full strength after about 6 days. The total curing process may be accelerated by curing at elevated temperatures such as between 40-60° C. As noted above, the hardening process may also be accelerated by utilizing a tin or titanium catalyst. The resultant coating may generally be a transparent, hard, thin film on the surface of the substrate. In some embodiments, the coating may have a thickness of from about 2 μmm to about 5 μm.

The coating formed by applying the corrosion protection composition to the substrate may form covalent bonds with the substrate to ensure good adherence and protect against delamination. For example, in the case of coating aluminum substrates, the composition may etch the oxide layer of the aluminum substrate surface to reveal hydroxyl functionalities. Reactive functionalities of the composition may then form stable chemical bonds with the functionalities of the substrate.

Any metal substrate may be coated with the corrosion protection composition, including alloys of various metals. As noted above, the corrosion protection composition has been shown to be especially useful for coating aluminum and aluminum alloy substrates.

Coatings on substrates produced by the corrosion protection composition may be coated with specially developed top coats to provide further beneficial characteristics to the coated substrate.

EXAMPLES

For each of the Examples below, 2 inch by 2 inch metal coupons were dip-coated with the corrosion protection composition described herein. The coated coupons were air-dried overnight and then heated at 60° C. for 5 hours with the exception of the coupons used for immersion testing, which were cured for 15 days at 60° C. The coated coupons were then stored in a dry box (McDry) at 2% relative humidity until required for experimentation. Similar results to those described below were obtained on coupons that were air dried in ambient conditions for 24 hours, then heated to from 40° C. to 60° C. for 2 hours and finally left in ambient conditions for 48 hours.

Example 1

Outdoor Exposure and Corrosion Studies

A total of 12 aluminum alloy coupons were used for this study—four 2"×2" 6061A1 coupons, four 2"×2" 2024A1 coupons, and four 2"×2" 7075 A1 coupons. One coupon in each set was left bare, two coupons in each set were coated with the corrosion protection composition, and one coupon in each set was coated and scribed. All 12 coupons were mounted on a test rack and exposed to the high-altitude Muana Loa test site on the Big Island, Hi., which was established by the Hawaii Corrosion Laboratory, University of Hawaii. This test site was chosen for the high level of solar radiation exposure. The coupons were retrieved after 4 months of exposure.

Each coupon was scanned using a VIEEW instrument before and after the 4 month exposure period. Visual comparison of the VIEEW scans before and after exposure revealed no visible damages to the coupons coated in the corrosion protection composition.

Example 2

Immersion Test

A 3.15 wt % NaCl solution was prepared using reagent-grade chemicals and ultrapure 18 MΩ·cm resistivity water. Harrison's solution was prepared by adding 3.5 g/l ammonium sulfate and 0.5 g/l sodium chloride to ultrapure water. The Harrison's solution was diluted to 10% strength.

NaCl Immersion

Figure 3:
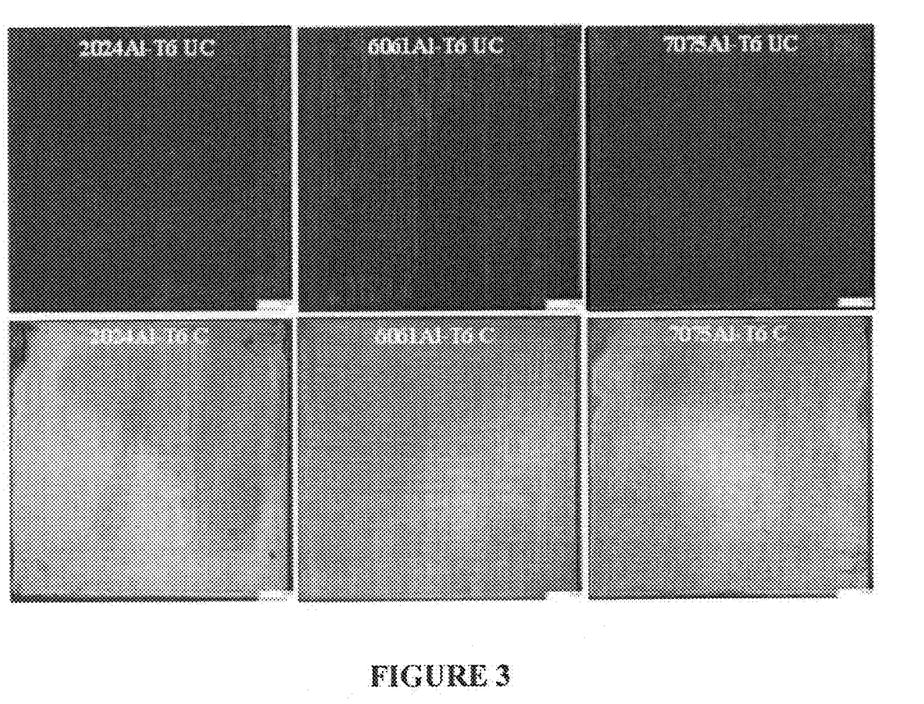
FIG. 3 is a series of VIEEW images taken of coated and uncoated aluminum alloy coupons after immersion in 3.15 wt % NaCl solution for 30 days.

A set of three coupons of three different aluminum alloys (2024A1, 6061A1, and 7075A1) were coated with the corrosion protection composition as described above and immersed in the 3.15 wt % NaCl solution prepared as described above for 30 days. Uncoated coupons of the same aluminum alloys were also immersed simultaneously for comparison. FIG. 3 shows the VIEEW analysis of coated (C) and uncoated (UC) coupons after 30 days of immersions. Uncoated coupons suffered severe surface damage due to corrosion, while the coated coupons were not affected. Slight corrosion at the edges of the coated coupons may be due to edge defects in the coating during the dip-coating process.

Harrison's Solution Immersion

Figure 4:
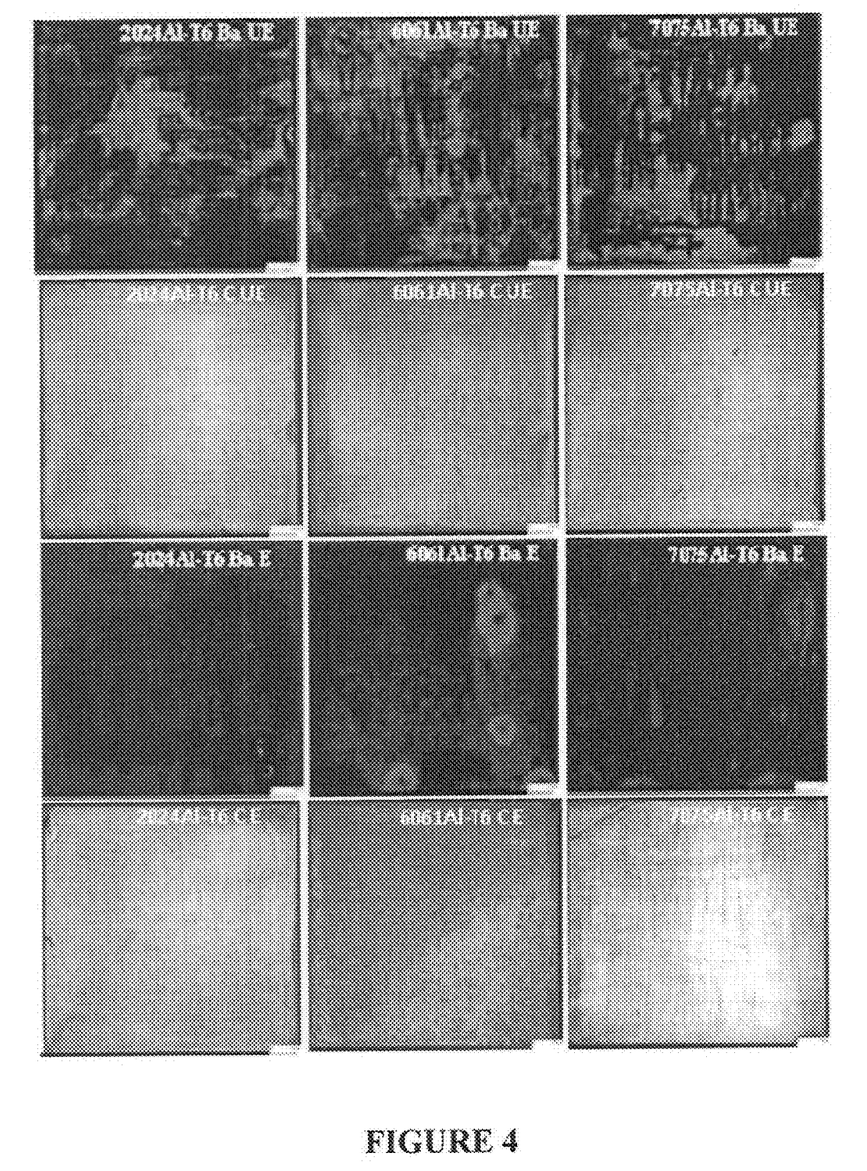
FIG. 4 is a series of VIEEW images taken of coated and uncoated aluminum alloy coupons after immersion in 10% Harrison's solution for 30 days.

A set of nine coated coupons of aluminum alloys (2024A1, 6061A1, and 7075A1) and three uncoated coupons were exposed to Q-Sun for 60 hours. Six of the nine coated coupons and the three uncoated coupons were subsequently immersed in Harrison's solution prepared as described above. An additional six coated coupons that were not exposed to UV light were also immersed in Harrison's solution prepared as described above. The coupons were retrieved after 30 days of immersion. All coupons were then washed with ultrapure water and air dried, at which point VIEEW images were taken of each of the coupons. FIG. 4 shows the VIEEW images taken for the various samples. Each sample is labeled with the aluminum alloy type and whether it was coated (C) or uncoated (UC) and exposed to UV radiation (E) or unexposed to UV radiation (UE).

Neither the UV exposed nor the non-UV exposed coated coupons showed signs of corrosion, suggesting that the corrosion protection composition acted as an impervious coating under immersion conditions even after UV exposure. Uncoated coupons suffered severe corrosion.

Example 3

Accelerated Weather Corrosion Test

Figure 5:
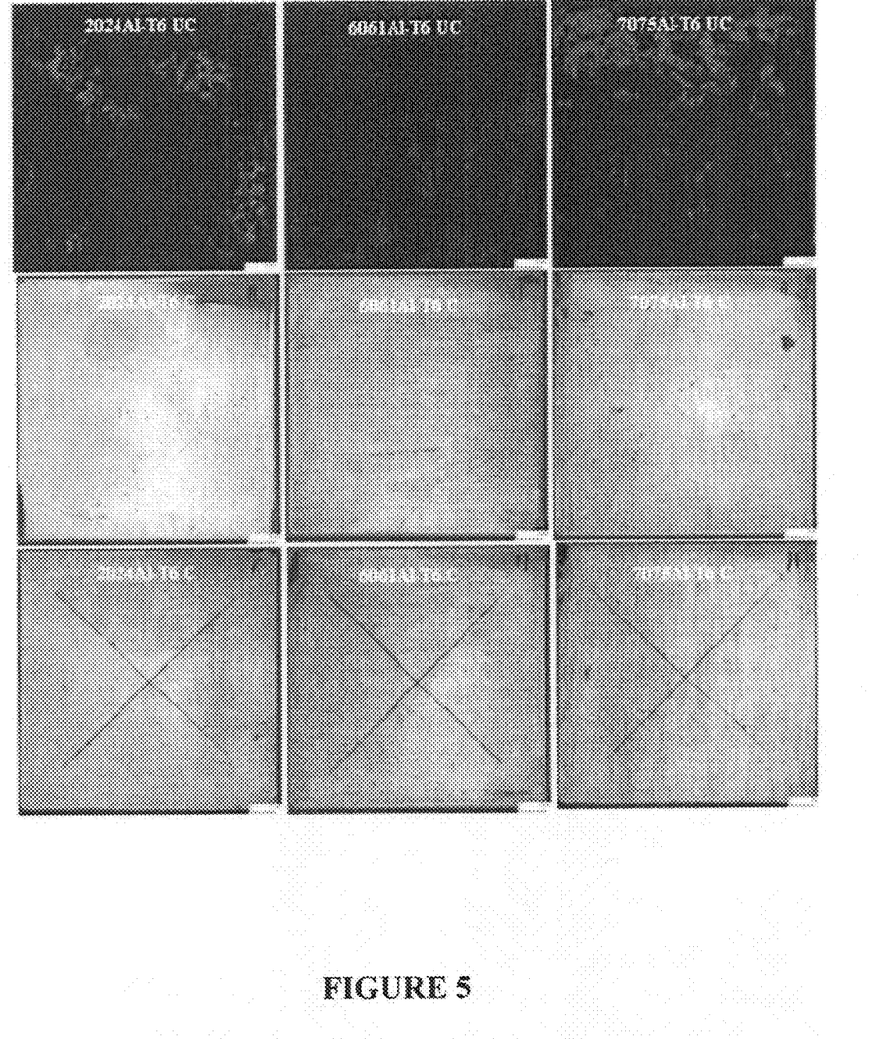
FIG. 5 is a series of VIEEW images taken of coated and uncoated aluminum alloy after exposure in a Singleton CCT-10 Cyclic Corrosion Test Chamber for 8 days.

Three types of coated aluminum alloy coupons (2024A1, 6061A1, and 7075A1) were mounted on a plastic rack and exposed to accelerated weather environment in a Singleton CCT-10 Cyclic Corrosion Test Chamber for 8 days. One coated coupon from each set was scribed to study the effect of corrosion at a deliberate coating. defect. For comparative purposes, uncoated coupons of the same aluminum alloys were exposed simultaneously. The test was conducted as per GM9540P standards. VIEEW images of the coupons after exposure are shown in FIG. 5.

The uncoated coupons suffered severe surface damage due to corrosion, while coated coupons were not affected. Slight corrosion at the edges of the coated coupons may be due to edge defects. Scribed coated coupons corroded in the scratch area, but there was no sign of coating lift-off adjacent to these scribed areas.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A silicone network-based corrosion protection coating composition comprising:
 a first mixture comprising:
  a first silane selected from the group consisting of methyltriacetoxysilane and dimethyldiacetoxysilane;
  a second silane of methyltrimethoxysilane; and
  a third silane selected from the group consisting of tetramethoxysilane and tetraethoxysilane.

2. The silicone network-based corrosion protection coating composition as recited in claim 1, further comprising:
 a second mixture comprising an alkali metal salt mixed together with the first mixture.

3. The silicone network-based corrosion protection coating composition as recited in claim 2, wherein the alkali metal salt is sodium bicarbonate or potassium bicarbonate.

4. The silicone network-based corrosion protection coating composition as recited in claim 2, further comprising:
 a third mixture comprising a titaniumalkoxide mixed together with the first mixture and the second mixture.

5. The silicone network-based corrosion protection coating composition as recited in claim 4, wherein the titaniumalkoxide is titanium (IV) ethoxide or titanium (IV) methoxide.

6. The silicone network-based corrosion protection coating composition as recited in claim 3, further comprising:
 a fourth mixture comprising a tin catalyst or a titanium catalyst mixed together with the first mixture, the second mixture, and the third mixture.

7. The silicone network-based corrosion protection coating composition as recited in claim 6, wherein the tin catalyst is selected from the group consisting of dibutyl tin dilaurate, di-n-butyldiacetoxytin, dibutyltin diisooctylmaleate, di-n-butylbis(2,4-pentanedionate)tin, di-n-butylbutoxychlorotin, dioctyltindilaurate, dimethyltin dineodecanoate, and bis(neodecanoate)tin, and the titanium catalyst is selected from the group consisting of titanium 2-ethylhexoxide, titanium di-n-butoxide (bis-2,4- pentanedionate), titanium diisopropoxide (bis-2,4-pen-tanedionate), titanium diisopropoxide bis(ethylacetoacetate), titanium trimethylsiloxide.

8. The silicone network-based corrosion protection coating composition as recited in claim 1, wherein the first mixture further comprises a first solvent.

9. The silicone network-based corrosion protection coating composition as recited in claim 8, wherein the first solvent is selected from the group consisting of isopropanol, methanol, ethanol, and butanol.

10. The silicone network-based corrosion protection coating composition as recited in claim 6, wherein the fourth mixture further comprises a second solvent and a co-solvent.

11. The silicone network-based corrosion protection coating composition as recited in claim 10, wherein the second solvent is selected from the group consisting of isopropanol, methanol, ethanol, and butanol and the co-solvent is diethlyether.

12. The silicone network-based corrosion protection coating composition as recited in claim 1, wherein each of the first silane, the second silane, and the third silane are from about 90% to about 99% pure.

13., The silicone network-based corrosion protection coating composition as recited in claim 2, wherein the second mixture comprises from 2.0% to 15.0% alkali metal salt.

14. The silicone network-based corrosion protection coating composition as recited in claim 4, wherein the third mixture comprises from 0.1% to 2.0% titanium alkoxide.

15. The silicone network-based corrosion protection coating composition as recited in claim 6, wherein the fourth mixture comprises from 0.05% to 0.20% tin catalyst or titanium catalyst.

16. The silicon network-based corrosion protection coating composition as recited in claim 1, wherein the silicon network-based corrosion protection coating composition is coated on a metal substrate.

* * * * *